UNITED STATES PATENT OFFICE.

CONSTANTINE FAHLBERG AND CONRAD SEMPER, OF PHILADELPHIA, PENNSYLVANIA, ASSIGNORS TO JOHN HARRISON, GEO. L. HARRISON, JR., AND THOMAS S. HARRISON, ALL OF SAME PLACE.

METHOD OF REMOVING IRON FROM FERRUGINOUS SALINE SOLUTIONS.

SPECIFICATION forming part of Letters Patent No. 257,567, dated May 9, 1882.

Application filed November 23, 1881. (No specimens.)

*To all whom it may concern:*

Be it known that we, CONSTANTINE FAHLBERG and CONRAD SEMPER, both of the city of Philadelphia, State of Pennsylvania, have invented an Improved Method of Removing Iron from Ferruginous Aluminous Solutions, or from ferruginous solutions of the salts of the alkalies, alkaline earths, or metallic bases, of which the following is a specification.

The object of our invention is to provide a means of removing the oxides of iron from solutions in which—as, for instance, aluminous solutions—the presence of iron is deleterious to the product to be manufactured therefrom or is objectionable in the process by which such product is obtained.

Our invention consists in the treatment of ferruginous solutions with plumbic dioxide for the precipitation therefrom of iron as plumbate of iron, as hereinafter described and claimed.

We do not restrict our invention to the manufacture of alum or aluminous products, as it is obvious that it is applicable to the treatment of a ferruginous solution of a soluble salt of any alkali, alkaline earth, or metallic base, provided only that such alkali, alkaline earth, or metallic base is not acted upon or materially precipitated by plumbic dioxide.

We do not restrict our invention to the use of plumbic dioxide alone, as we contemplate the use of such compounds of lead as contain plumbic dioxide, and the use of neutral monobasic or polybasic salts of lead or the oxides of lead, which may be converted into plumbic dioxide in the ferruginous solution treated.

We do not claim the use of metallic lead, as it cannot be directly converted into plumbic dioxide, but simply acts to convert ferric into ferrous oxide.

In cases where the acid of the salt, from the solution of which it is desired to remove the iron, forms with lead an insoluble lead salt, the resulting purified solution will contain no lead, or, at most, only a trace thereof. If the acid of said salt is of such a nature as to form with lead a soluble lead salt, a small quantity of lead may go into solution, especially if the iron present is in the ferrous state. In such cases where lead is objectionable it may be removed by any of the well-known processes— such as by treating the solutions with sulphureted hydrogen, or with sulphuric acid, or with a sulphate of the material of which the solution treated consists.

Should the iron present in the solution treated by our process be in the ferrous state, part of the plumbic dioxide employed will be decomposed in oxidizing said ferrous oxide into ferric oxide, as we have ascertained that the iron is precipitated by plumbic dioxide as ferric plumbate. To avoid the loss of plumbic dioxide resulting from such oxidation other cheaper oxidizing agents may be successfully employed. In most cases the loss of plumbic dioxide by reason of such oxidation is so small as to be immaterial. From an economical point of view it is, however, advisable to resort to previous oxidation of the ferrous oxide into ferric oxide in all cases where soluble lead salts can be formed in the subsequent treatment of the ferruginous solution with plumbic dioxide.

The temperature of the solution to which the plumbic dioxide is to be added is not essential; but we prefer cold solutions. The strength of the solutions to be treated is unessential; but preferably they should be as concentrated as possible. The plumbic dioxide should be well washed and freed from foreign matter.

It is advantageous to have the solutions to be treated by plumbic dioxide for removal of iron therefrom clear and free from mechanically-suspended impurities, as these impurities would remain with the plumbic dioxide, by which it would eventually become objectionably charged with foreign matter and unfit to be recovered and used for removing iron from new ferruginous solutions.

It is desirable that the solutions of the salts to be freed from iron should be as neutral as possible and should not contain a large excess of acid; otherwise the complete precipitation of the iron could only be effected by large quantities of the precipitating agent.

The following is a convenient method of practicing our invention, viz: A concentrated solution of sulphate of alumina obtained from bauxite or other aluminous material, or of any soluble salt of a metal, alkaline earth, or alkali made in the usual manner and containing iron, is first freed by any of the well-known methods from its insoluble impurities. It is then treated, should the iron be present as ferrous oxide, with a small quantity of a solution of chloride of lime or other convenient oxidizing agent, heated, and left to cool. If, however, the iron be present as ferric oxide, or if the quantity of ferrous oxide present is small, this application of heat and oxidation is not necessary and should be omitted. A certain quantity of plumbic dioxide is then added, which, according to the amount of iron present in the solution aforesaid, should be from five to twenty per cent. (more or less) of the salt present in the said solution, and the mixture briskly stirred for some time. The solution is then separated from the insoluble parts by any well-known method—such as by letting it subside or by passing it through a filter or filter-press. The clear solution will be found to be freed entirely, or almost entirely, from iron. This solution can be utilized as may be desirable, or it may be concentrated and left to crystallize; or it may be run into a cake or evaporated to dryness. The insoluble part, which contains the iron, may be washed with water to remove the adhering salt solution, and this water containing the salt in solution may either be added to the solution first obtained or be utilized in the next operation.

Having thus described our invention, we claim—

1. The method of removing iron from a ferruginous solution of the salt of a metal, alkali, or alkaline earth, which consists in treating said ferruginous solution with plumbic dioxide, either by adding said plumbic dioxide to said solution or by converting a neutral monobasic or polybasic salt of lead or an oxide of lead into plumbic dioxide in said solution.

2. The method of manufacturing sulphate of alumina or aluminous cake free, or almost free, from iron, which consists in treating ferruginous aluminous solutions with plumbic dioxide in the manner set forth.

In testimony whereof we have hereunto signed our names this 10th day of November, A. D. 1881.

CONSTANTINE FAHLBERG.
CONRAD SEMPER.

In presence of—
W. C. STRAWBRIDGE,
J. BONSALL TAYLOR.